G. GOETZ.
AUTOMATIC WEIGHING AND RECORDING MINING CAR SCALE.
APPLICATION FILED AUG. 7, 1908.
1,017,747.
Patented Feb. 20, 1912.
13 SHEETS—SHEET 1.
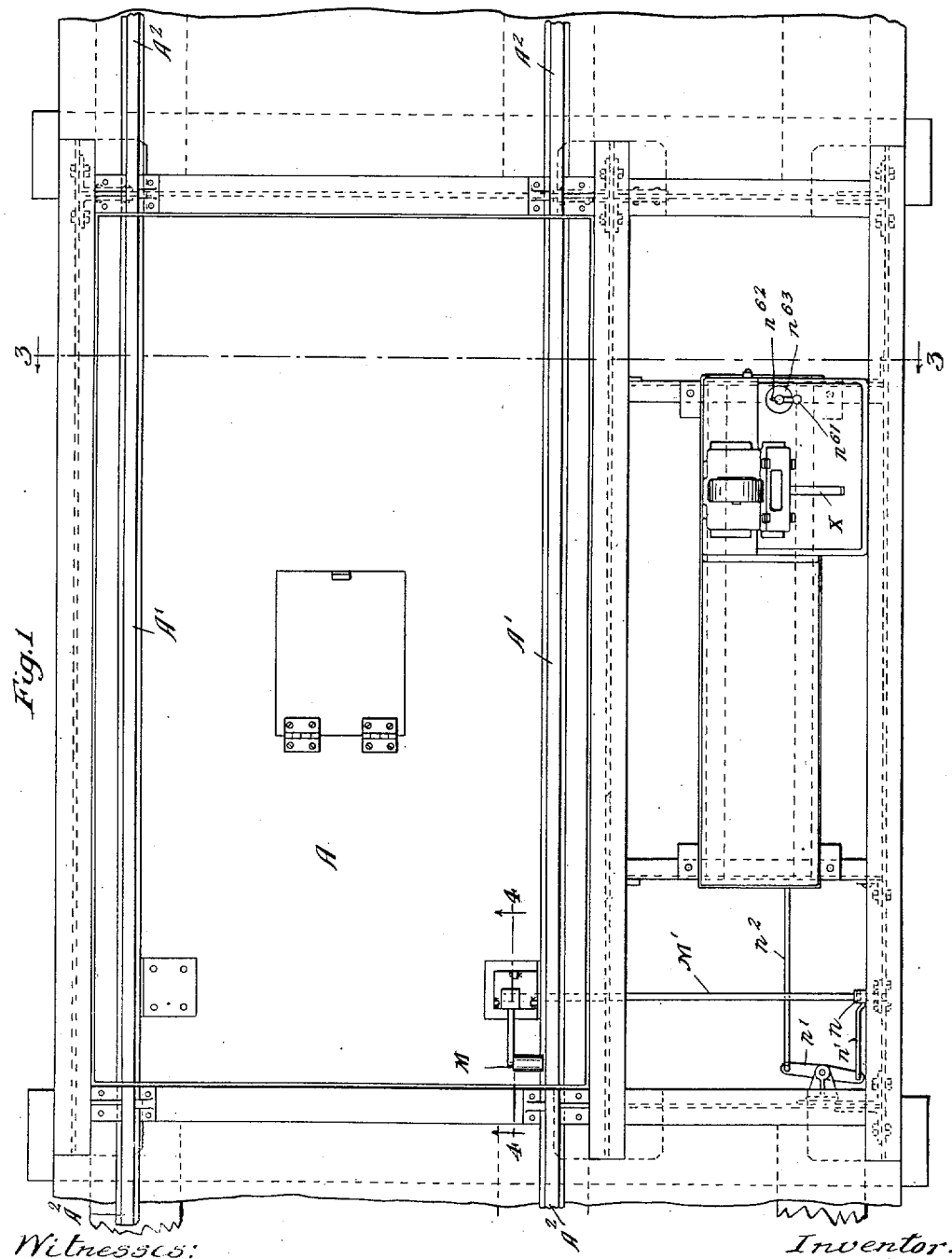
Witnesses:
Wm. Geiger
H. W. Munday
Inventor:
George Goetz
By Munday, Evarts, Adcock & Clarke
Attorneys

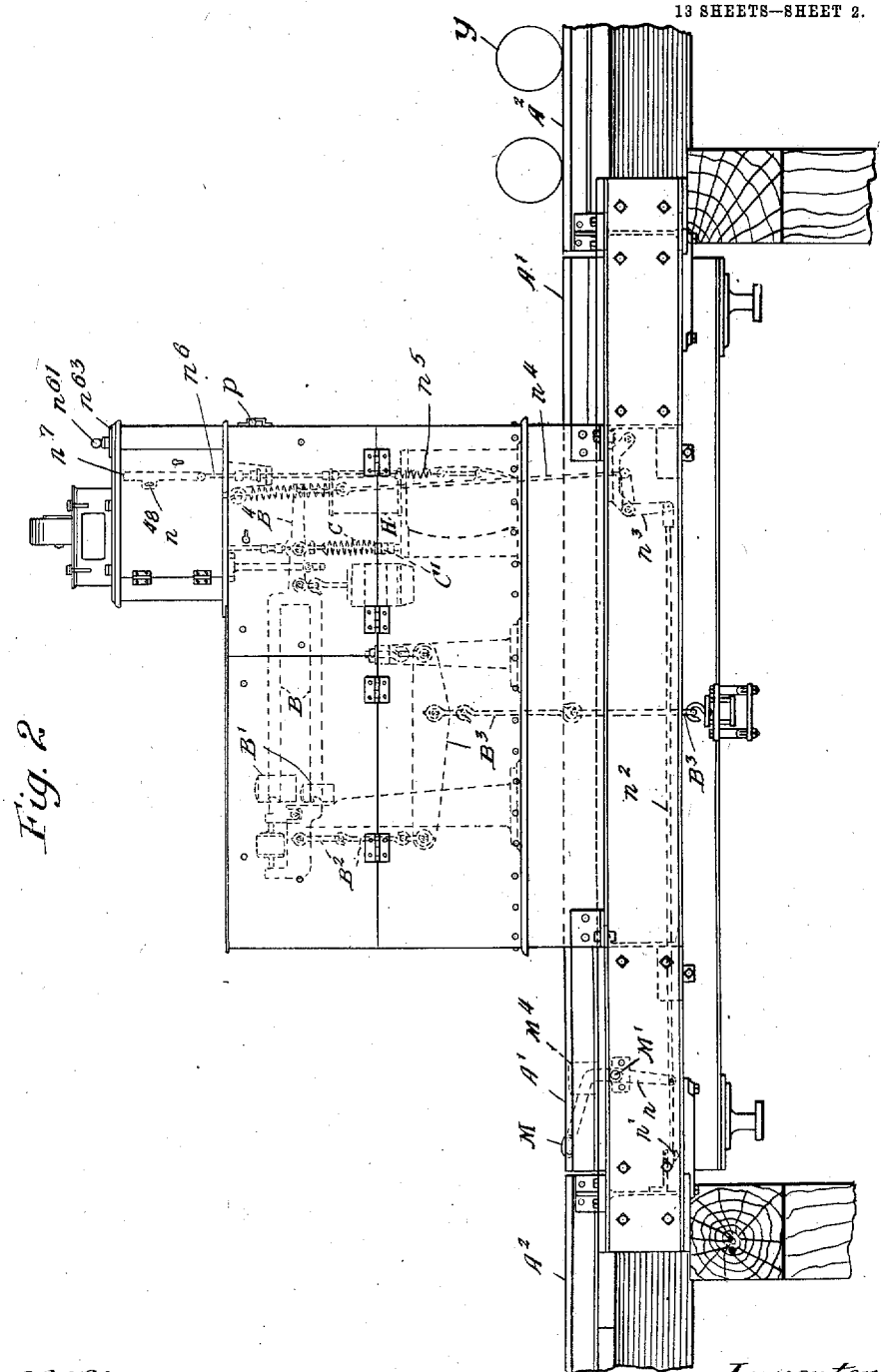

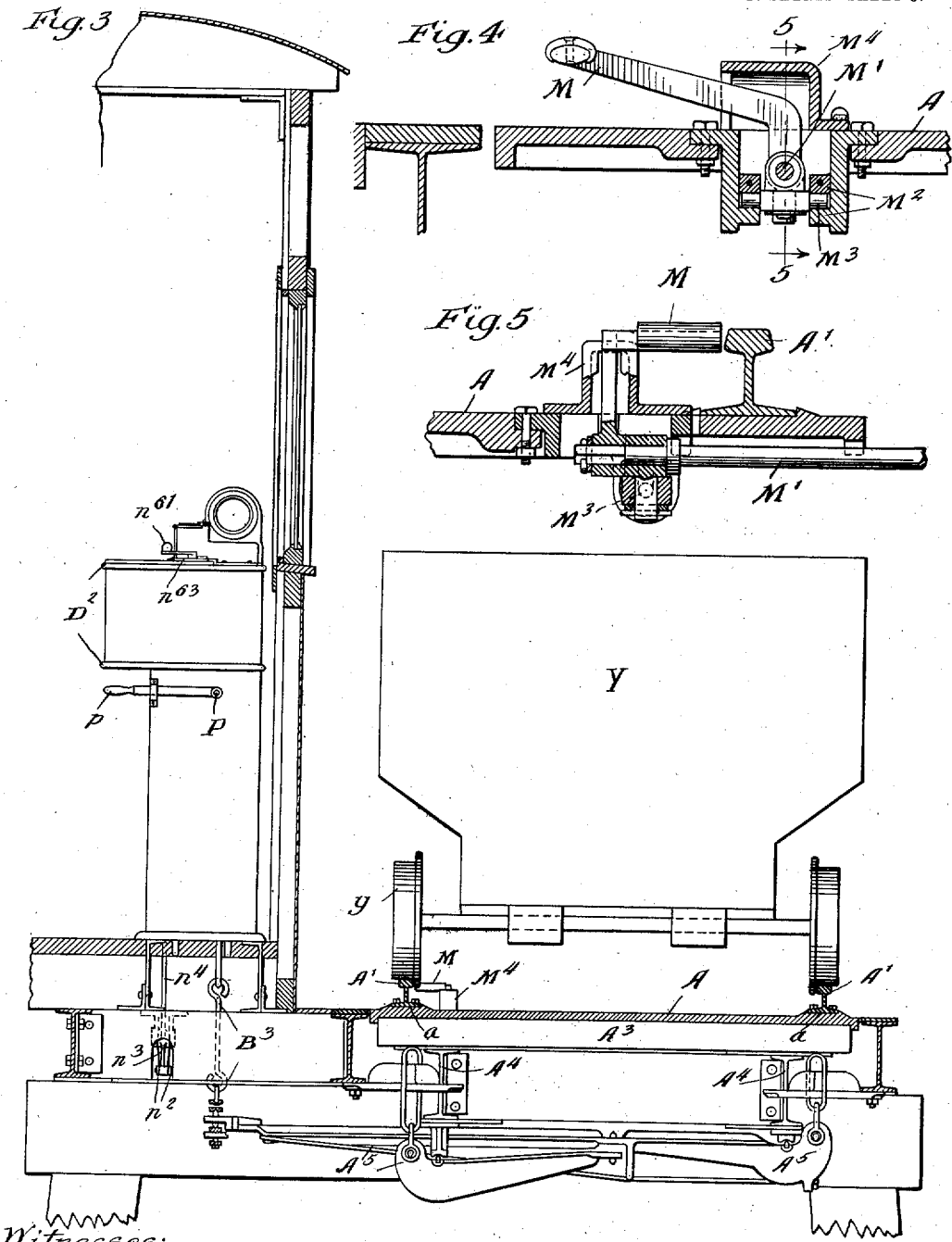

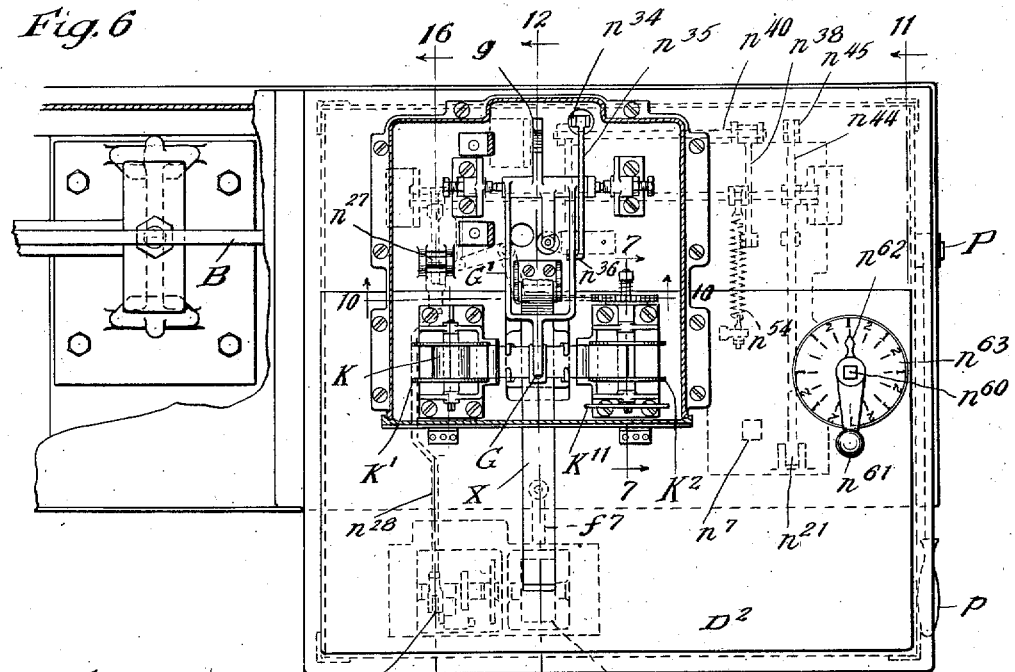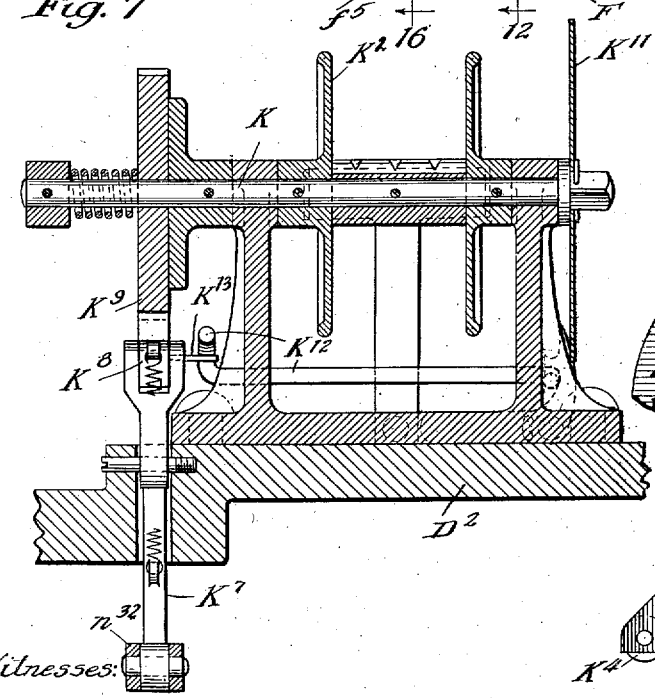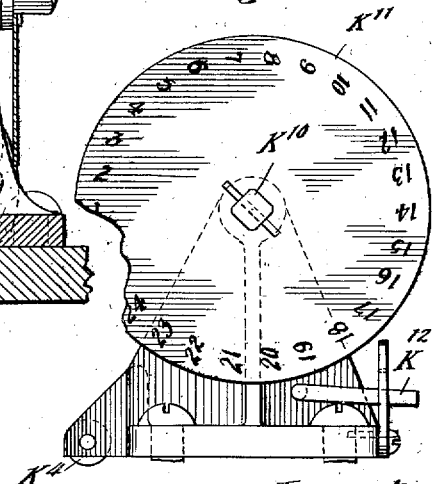

G. GOETZ.
AUTOMATIC WEIGHING AND RECORDING MINING CAR SCALE.
APPLICATION FILED AUG. 7, 1903.
1,017,747.
Patented Feb. 20, 1912.
13 SHEETS—SHEET 5.
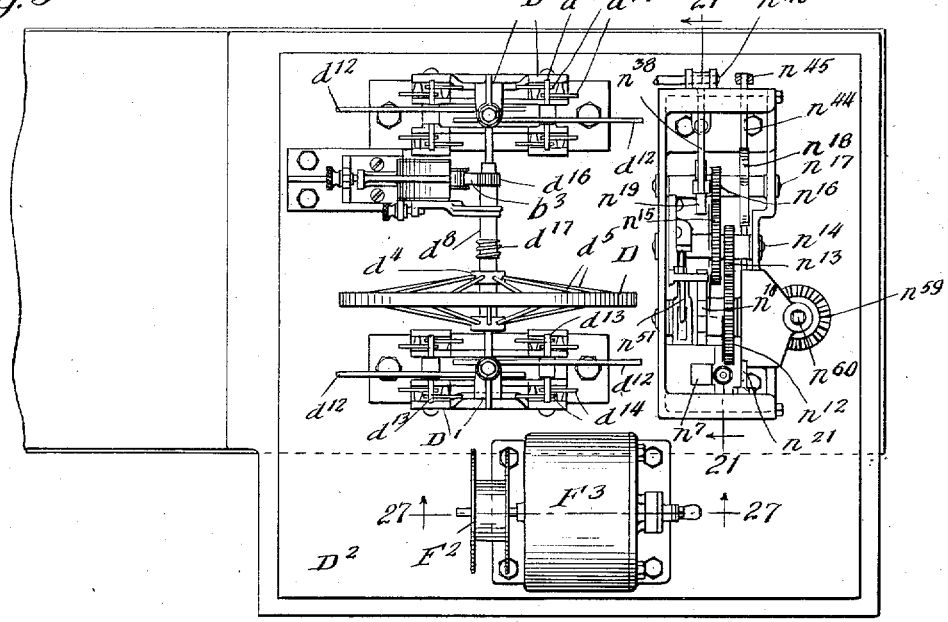
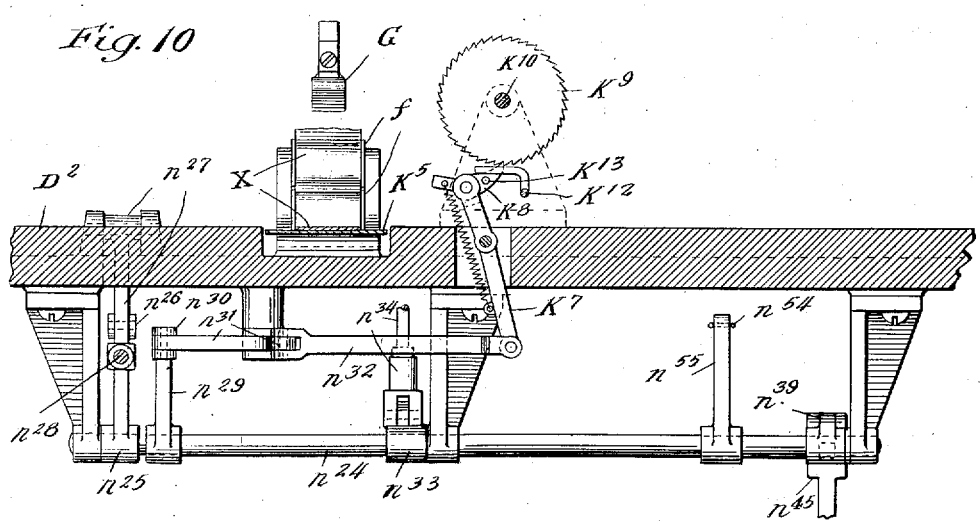
Witnesses:
Wm. Geiger
H. M. Munday
Inventor:
George Goetz
By Munday, Evarts, Adcock & Clark.
Attorneys

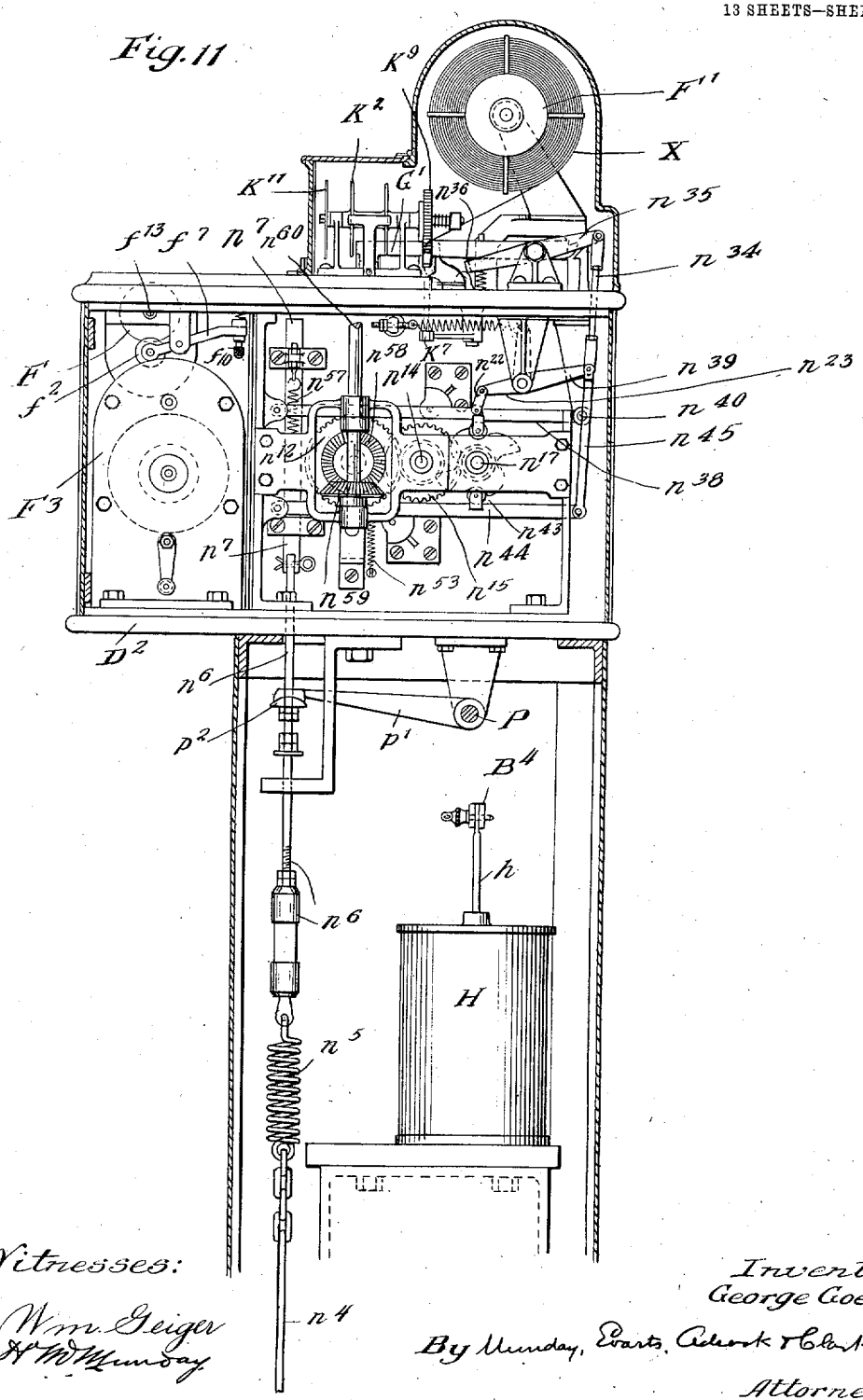

G. GOETZ.
AUTOMATIC WEIGHING AND RECORDING MINING CAR SCALE.
APPLICATION FILED AUG. 7, 1908.
1,017,747.
Patented Feb. 20, 1912.
13 SHEETS—SHEET 7.
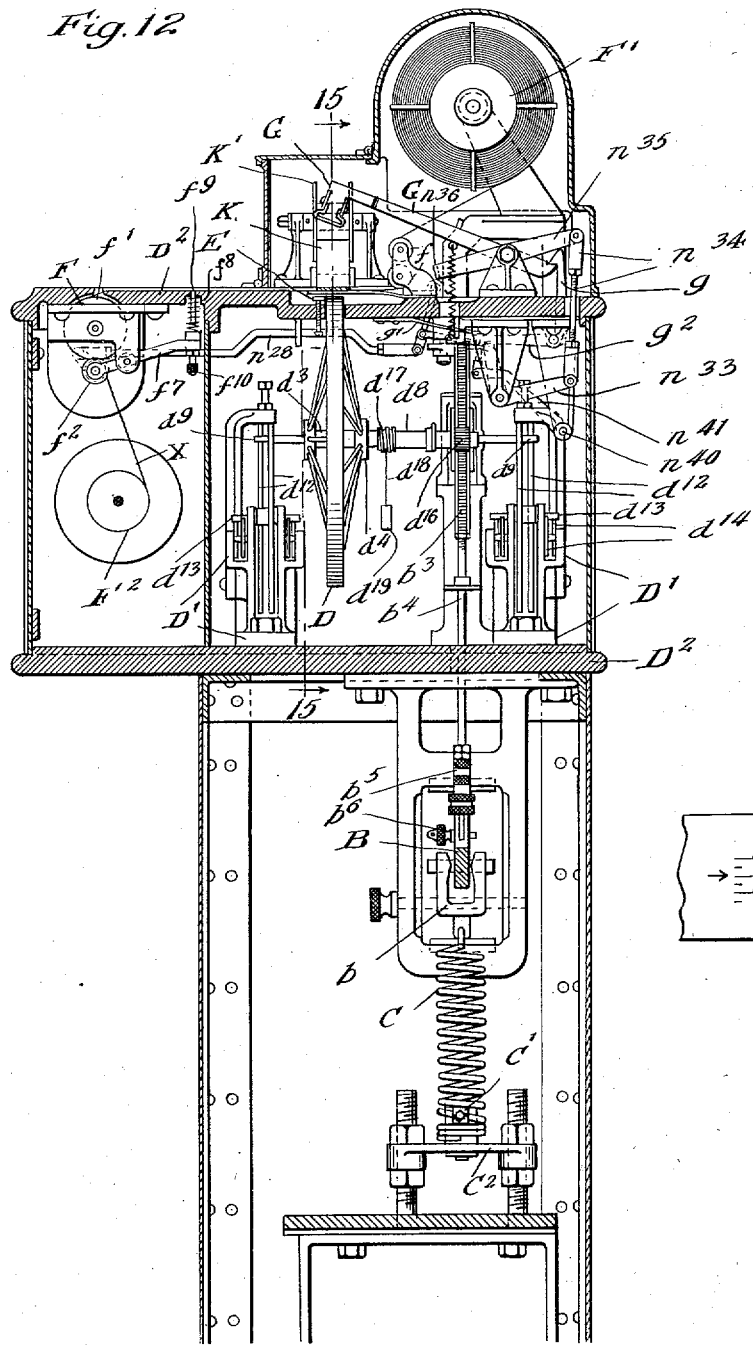
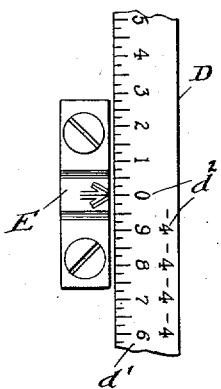
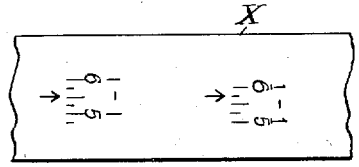
Witnesses:
Wm. Geiger
H. W. Munday
Inventor:
George Goetz
By Munday, Evarts, Adcock & Clarke
Attorneys

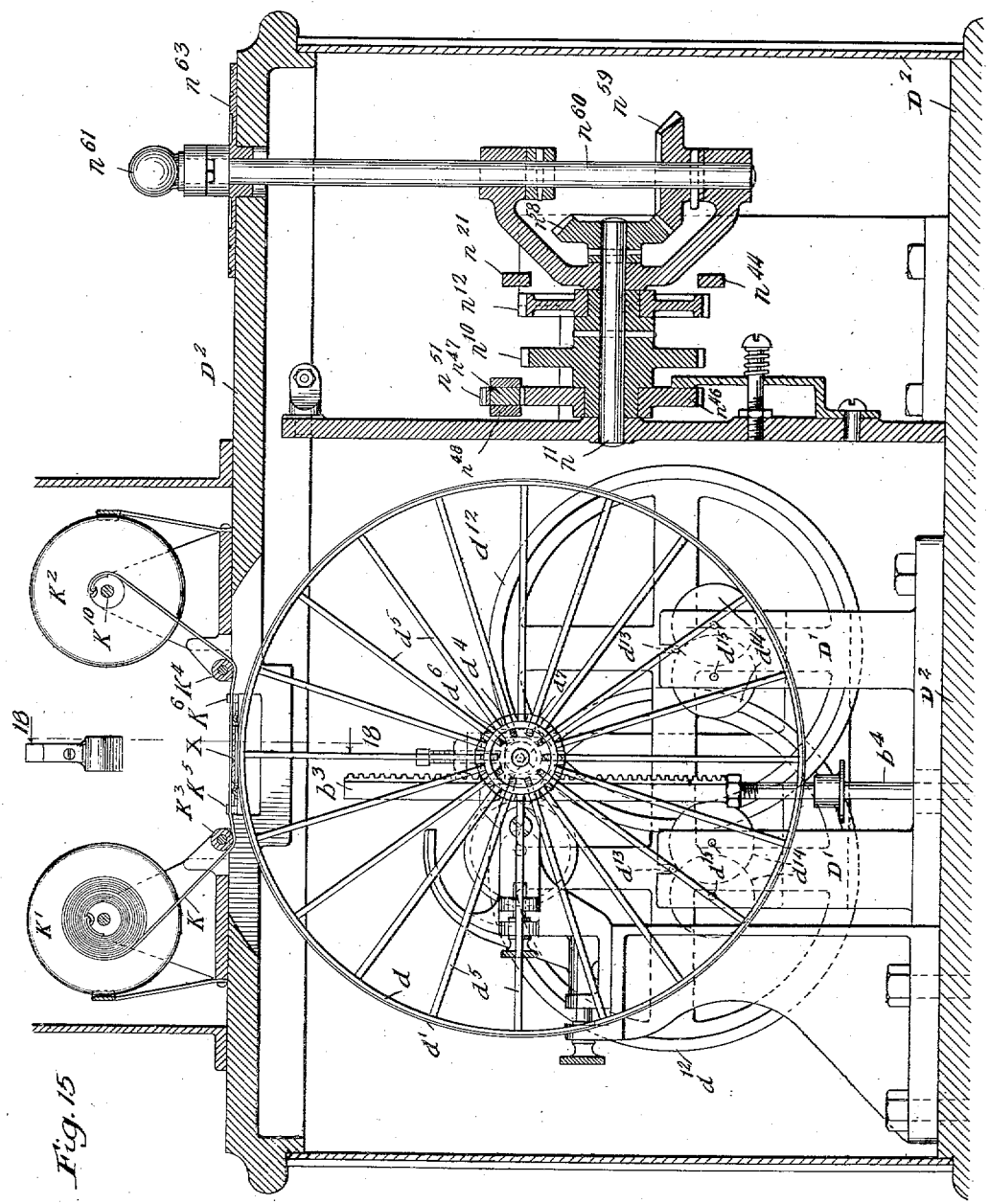

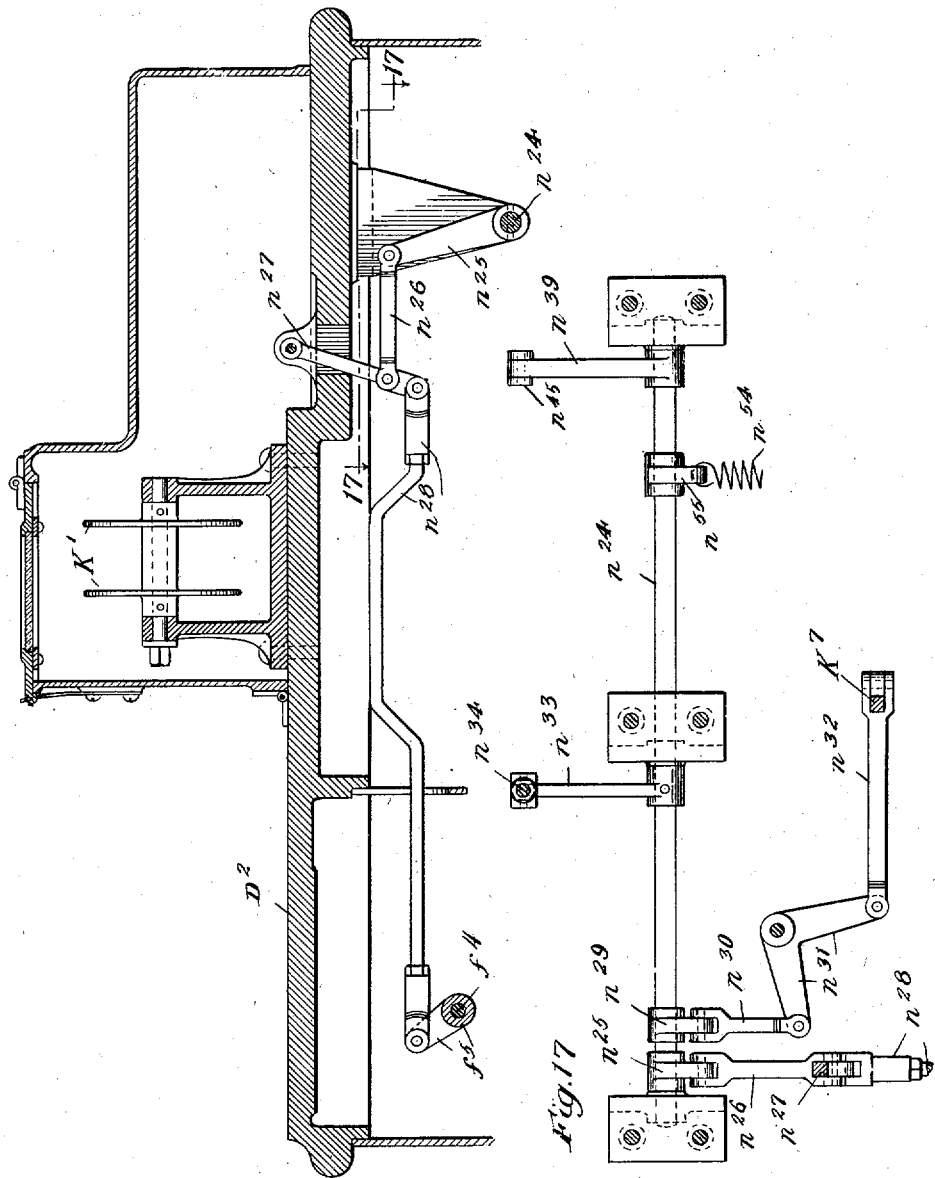

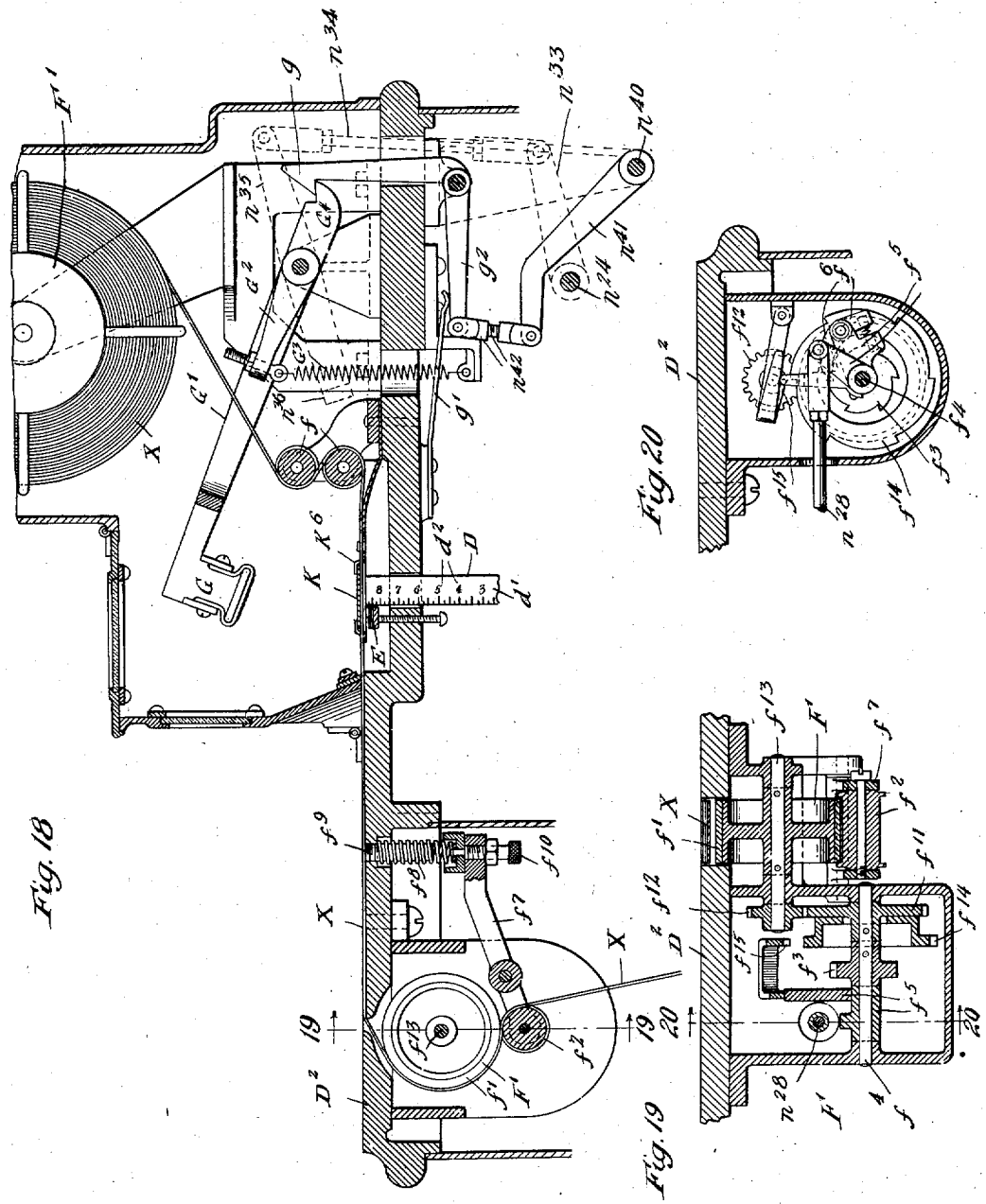

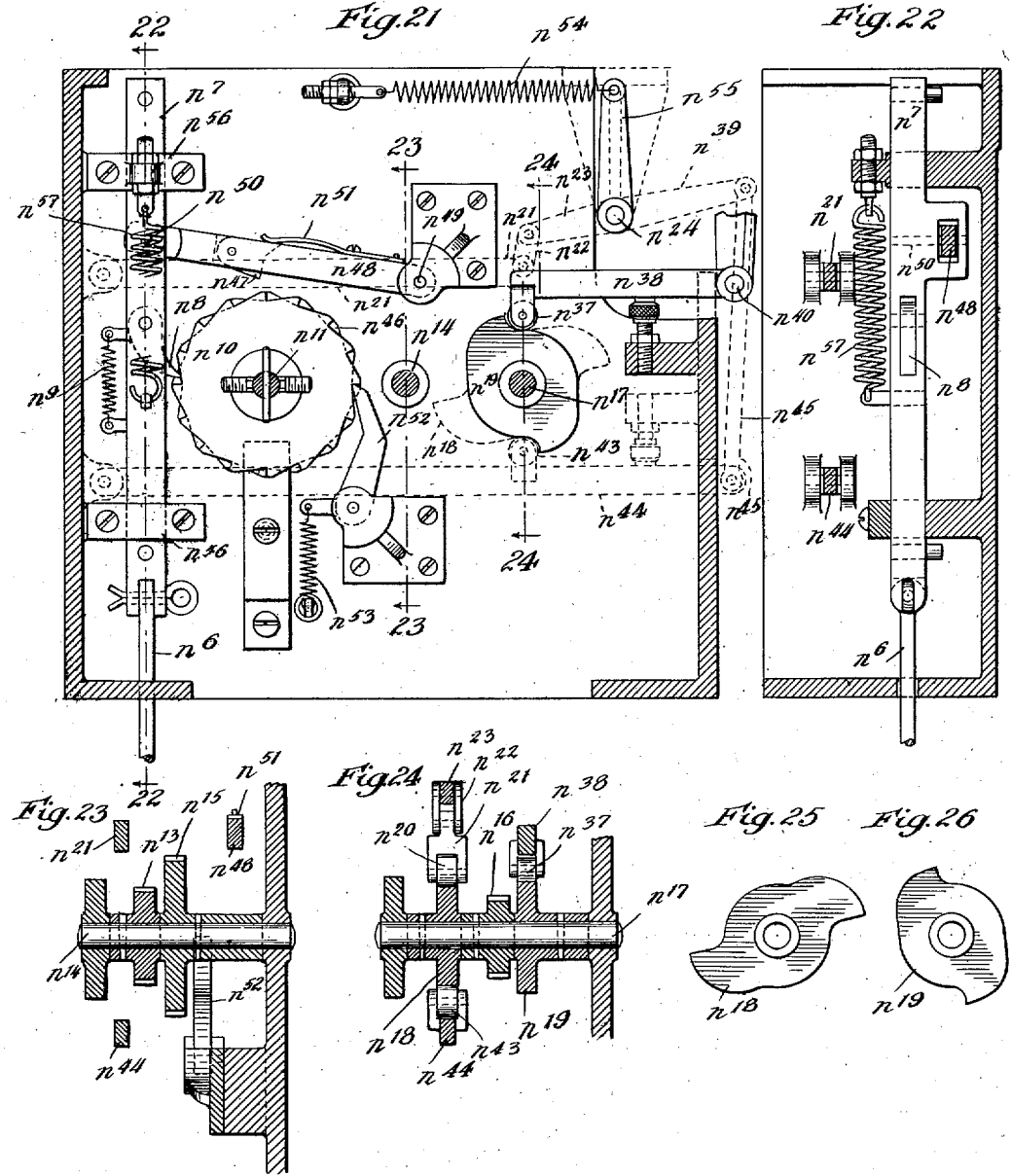

G. GOETZ.
AUTOMATIC WEIGHING AND RECORDING MINING CAR SCALE.
APPLICATION FILED AUG. 7, 1908.
1,017,747.
Patented Feb. 20, 1912.
13 SHEETS—SHEET 12.
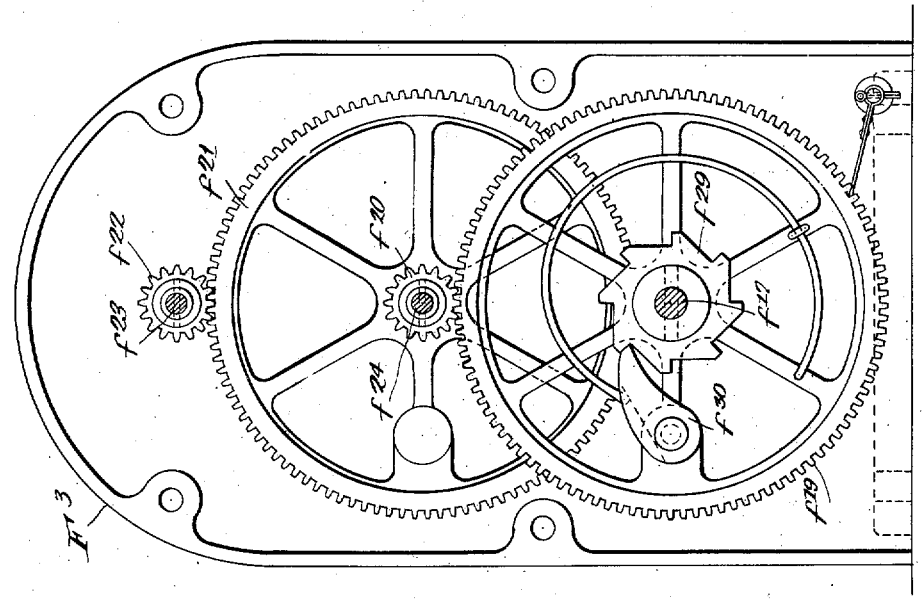
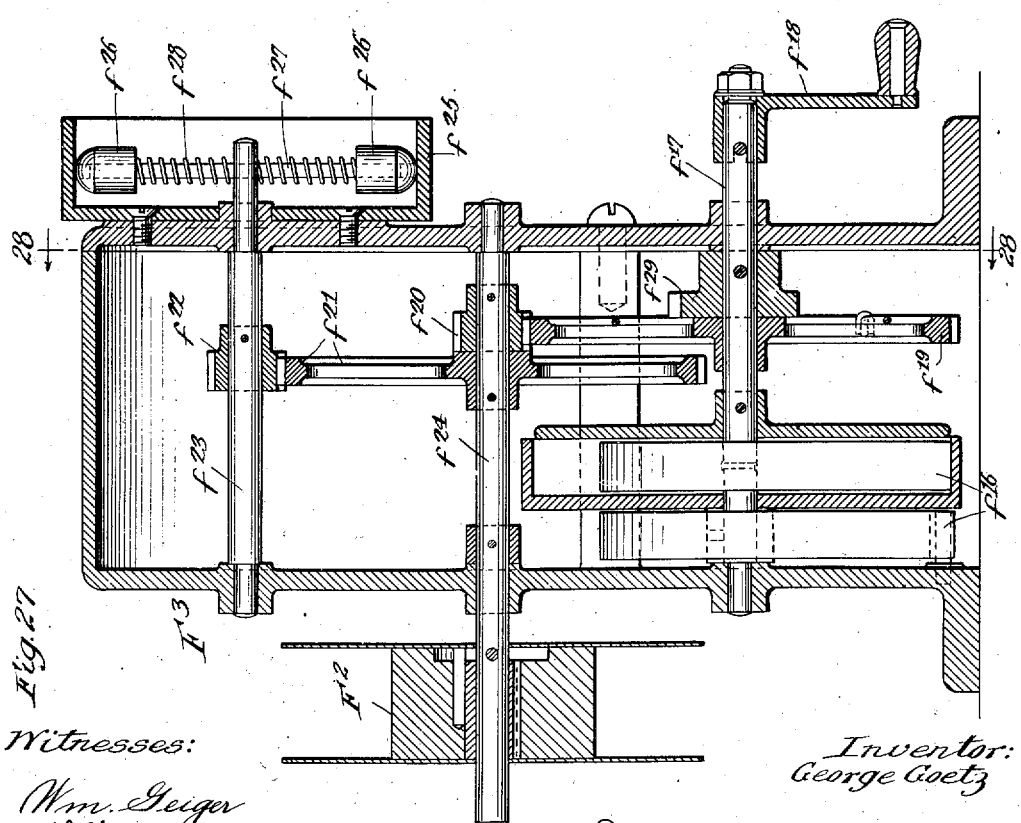

G. GOETZ.
AUTOMATIC WEIGHING AND RECORDING MINING CAR SCALE.
APPLICATION FILED AUG. 7, 1908.
1,017,747.
Patented Feb. 20, 1912.
13 SHEETS—SHEET 13.
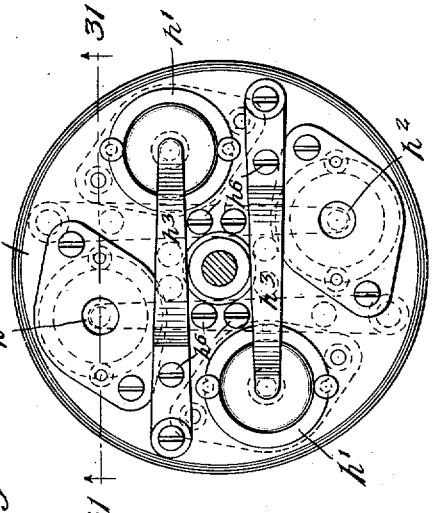
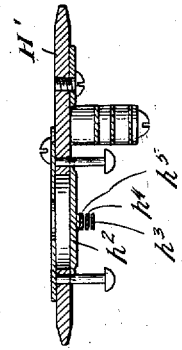
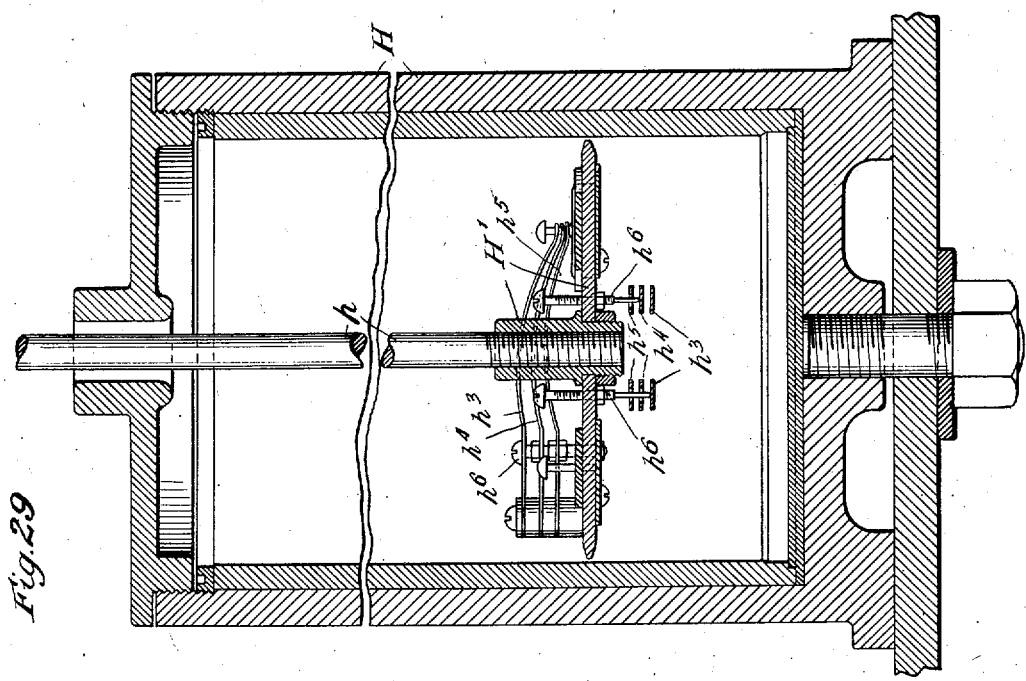
Witnesses:
Wm. Giger
H. W. Munday
Inventor:
George Goetz
By Munday, Evarts, Adcock & Clarke,
Attorneys

UNITED STATES PATENT OFFICE.

GEORGE GOETZ, OF CHICAGO, ILLINOIS, ASSIGNOR TO STREETER-AMET WEIGHING & RECORDING COMPANY, OF CHICAGO, ILLINOIS, A CORPORATION OF ILLINOIS.

AUTOMATIC WEIGHING AND RECORDING MINING-CAR SCALE.

1,017,747.  Specification of Letters Patent.  Patented Feb. 20, 1912.

Application filed August 7, 1908. Serial No. 447,379.

*To all whom it may concern:*

Be it known that I, GEORGE GOETZ, a citizen of the United States, residing in Chicago, in the county of Cook and State of Illinois, have invented a new and useful Improvement in Automatic Weighing and Recording Mining-Car Scales, of which the following is a specification.

My invention relates to scales for automatically weighing and printing or recording the weights of cars as they pass under continuous motion over the scale platform.

The object of my invention is to provide a weighing and recording car scale of a simple, efficient and durable construction by means of which cars may be accurately weighed and the weights thereof recorded within limits of a few pounds as the car passes continuously over the scale platform.

My invention consists in connection with a scale platform having track rails thereon, and provided with a track lever for automatically raising and releasing the impression hammer of the weight recording mechanism, and automatically actuating the paper strip feed mechanism and the inking ribbon through the agency of the car wheels as they pass over the scale platform, of a counterbalance spring connected with the scale beam below the same, and a printing wheel above the scale beam and connected therewith, so that the connection between the scale beam and the counterbalance spring and printing wheel may be short and direct, and thus enable the car while under motion to be accurately weighed and its weight recorded within limits of a few pounds.

It further consists, in connection with these parts, of a track lever on the scale platform, fulcrumed to swing in a plane parallel with the track rails so that any variation of distance of the car wheel flange from the track rail will not materially or detrimentally affect the operation of the track lever.

It further consists in connection with these parts, of a scale platform furnished with inclined track rail seats so that the cars may "drop" or run over the scale platform by gravity without the necessity of any tractive force being applied thereto.

It further consists in the novel construction of parts and devices, and in the novel combinations of parts and devices herein shown and described and more particularly specified in the claims.

Figure 1 is a plan view of an automatic weighing and recording mining car scale embodying my invention; Fig. 2 is a side elevation; Fig. 3, an enlarged section on line 3—3 of Fig. 1; Fig. 4, a detail section on line 4—4 of Fig. 1; Fig. 5, a detail section on line 5—5 of Fig. 4; Fig. 6, a partial plan view showing the case in horizontal section; Fig. 7, a detail section on line 7—7 of Fig. 6; Fig. 8, a detail elevation of certain parts shown in Fig. 7; Fig. 9, a partial plan view of the type wheel and other parts; Fig. 10, a detail vertical section on line 10—10 of Fig. 6; Fig. 11, an elevation partly in section looking on line 11—11 of Fig. 6; Fig. 12, a detail vertical section on line 12—12 of Fig. 6; Fig. 13, an enlarged detail plan view showing the indicator mark type and a portion of the type wheel; Fig. 14, a plan view showing a portion of the paper ribbon on which the weight is printed or indicated; Fig. 15, an enlarged section on line 15—15 of Fig. 12; Fig. 16, a detail section on line 16—16 of Fig. 6; Fig. 17, a detail plan partly in horizontal section, looking from line 17—17 of Fig. 16; Fig. 18, an enlarged detail vertical section on line 18—18 of Fig. 15; Fig. 19, a detail section on line 19—19 of Fig. 18; Fig. 20 a detail section on line 20—20 of Fig. 19; Fig. 21, a detail vertical section on line 21—21 of Fig. 9; Figs. 22, 23 and 24, detail sections on lines 22—22, 23—23 and 24—24, respectively, of Fig. 21; Figs. 25 and 26, detail views of the cam shown in Fig. 21; Fig. 27, an enlarged detail section on line 27—27 of Fig. 9; Fig. 28, a detail elevation looking from line 28—28 of Fig. 27; Fig. 29, an enlarged, detail, central, vertical section of the dash-pot; Fig. 30, a detail plan view of the dash-pot piston, partly in horizontal section and Fig. 31, a detail section on line 31—31 of Fig. 30.

In the drawing, A represents the platform of a car scale, B the scale beam, C the counterbalance spring, D the type or printing wheel, E the stationary indicator type, F the feed mechanism for the paper ribbon or strip X, G the printing hammer, H the dashpot, K the ink ribbon, M the track lever adapted to be automatically operated by the wheels of the mining car Y and N the track lever setting and connecting mechanism through which the printing hammer is automatically raised and released and the paper strip feed roller automatically turned and released, and the ink ribbon feed mechanism automatically actuated through the agency of the track lever M.

The scale platform A is preferably an iron or metallic casting, and furnished with seats $a$ for the track rails $A^1$ which connect with the track rails $A^2$ of the railway track at each end of the scale platform. The track rail seats $a$ are preferably higher at the entrance end than at the exit end so that the mining car Y may "drop" or run by gravity over the scale platform, the grade of the stationary track rails $A^2$ on each side of the scale platform and of the track rails $A^1$ on the scale platform due to the raised rail seats $a$ at the entrance end of the scale platform being preferably about a six-tenths per cent. grade; so that the mining car Y will "drop" or run by gravity over the scale platform and thus enable the car to be more accurately weighed while in motion, as it is thus freed from all traction errors or influences.

The scale platform A is furnished with wood or other cushioning or somewhat elastic supporting bars $A^3$ beneath the same, which are supported preferably upon steel I beams $A^4$; so that these cushioning bars $A^3$ may neutralize or compensate for any sudden jars or shocks that might be otherwise communicated to the scale platform by the sudden passage of the mining car Y onto, over and off the same, and thus eliminate sources of error in weighing and recording the weight which would be due to a more rigid construction of scale platform.

The scale beam B is provided with counterbalance weights $B^1$ for use in balancing the scale and is connected with the customary scale levers $A^5$ beneath the scale platform A, and upon which it is supported and by which scale levers the scale platform is connected with the scale beam B through suitable connecting links $B^2$ and connecting levers $B^3$. The scale platform is further provided with an extension $B^4$ at its end, through which it is connected with the counterbalance spring C below the scale beam, the type wheel D above the scale beam and dash-pot H below the scale beam, the type wheel and recording mechanism being arranged above the scale beam so that all the necessary connections between the scale beam and the counterbalance spring, dash-pot and type wheel may be as simple, short and direct as possible, and thus eliminate as far as may be all source of friction or binding between different parts of the mechanism and inaccuracies or errors in weighing and recording the weights incident thereto, and also so that any lateral vibrations of the scale beam or of the upright framework supporting it, incident to the passage of the car over the scale beam platform may be eliminated as sources of error as far as possible.

The counterbalance spring C is connected with the scale beam B through suitable connecting links or clevices $b$ and the counterbalance spring is furnished with suitable tension adjusting devices $C^1$ $C^2$.

The type wheel D has a metallic rim $d$, a type rim $d^1$ furnished with numeral type $d^2$, a double rimmed hub $d^3$, each having lateral flanges $d^4$ to receive the threaded and adjustable spokes $d^5$, which are furnished with screw threads $d^6$ and nuts $d^7$. The double rimmed hub $d^3$ of the type wheel is secured to a rotatable shaft $d^8$, which is furnished at each end with bearing spindles $d^9$. The type wheel spindles $d^9$ are very much reduced in diameter in respect to the shaft $d^8$. The spindles of the type wheel shaft are journaled or supported at each end upon a pair of large anti-friction wheels or rollers $d^{12}$, the shaft $d^{13}$ of each of which is in turn journaled upon a pair of anti-friction wheels or rollers $d^{14}$, the shafts $d^{15}$ of which are journaled on the standards $D^1$ on the frame $D^2$ of the weight recording mechanism. By this construction and journaling of the type wheel, I am enabled to make it very strong and rigid and accurately true in shape, and at the same time, very light in weight and to reduce its inertia as far as possible, and also the friction of its turning to a minimum, so that no appreciable inaccuracy in weighing or in recording the weight can result from inefficient action of the type wheel under influence of the scale beam and its counterbalance spring. The type wheel shaft $d^8$ is furnished with a spur gear $d^{16}$, which meshes with the rack $b^3$, which is adjustably connected by the connecting rod $b^4$ with the scale beam B through the adjustable connections $b^5$ $b^6$. The type wheel shaft $d^8$ is further provided with a spirally grooved pulley $d^{17}$, carrying a cord or line $d^{18}$ and a counterbalance weight $d^{19}$, which counterbalances or neutralizes the force required to turn the type wheel, and serves also to take up back lash and insures a more sensitive and accurate action of the type wheel in responding to the weight of the car being weighed.

The stationary indicator type E preferably consists of a narrow or indicator mark, and is mounted on the stationary recording mechanism frame $D^2$ adjacent to the type wheel D at one side thereof and directly over its shaft, so that the printing hammer G will cause a simultaneous impression to be made upon the paper strip or ribbon X by the indicator type E and by the particular numeral type on the type wheel which is directly over the type wheel shaft.

The feed mechanism F for the paper strip or ribbon X upon which the weight of the mining car Y is automatically printed or recorded, as it passes continuously over the scale platform B, preferably consists in a feed roller which is automatically turned as required by a suitable spring or other motor to cause the paper strip to be fed along the required space as each car passes over the scale platform. The paper strip X is thus fed from the reel or spool $F^1$ to the take up spool $F^2$, the paper strip passing over or around the several guide spools or rollers $f$ $f^1$ and $f^2$ and over and across the type wheel D and stationary indicator type E and under the inking ribbon K. The paper strip feed motor $F^3$ which actuates the paper strip feed device F may be a spring motor, and is preferably arranged to act upon the feed roller F through the paper strip X itself, the motor $F^3$ thus keeping the paper strip X normally under tension so that the moment the notched disk $f^3$ on the shaft $f^4$ is released by its spring pawl lever $f^5$ and pawl $f^6$, the paper strip or ribbon may be automatically fed forward the required distance. The guide roller $f^2$ for the paper strip X is mounted upon a movable arm or lever $f^7$ which is held against the paper feed roller F under the required tension by means of a spring $f^8$ on the stem $f^9$, the tension of the spring being regulated through the adjusting screw $f^{10}$. The releasing pawl lever $f^5$ for the paper strip feed roller F is automatically actuated from the track lever M at the entrance end of the scale platform as the last wheel $y$ of the mining car passes off of the scale platform through suitable connecting mechanism hereinafter to be described. The ratchet shaft $f^4$ is connected by spur gears $f^{11}$ $f^{12}$ with the shaft $f^{13}$ of the paper feed roller $f^1$. The ratchet shaft $f^4$ preferably has a ratchet $f^{14}$ and a pawl $f^{15}$ which is operated through suitable connecting mechanism from the track lever M to positively turn the paper strip feed roller F automatically.

The paper strip feed motor $F^3$ is a spring motor and comprises a spring $f^{16}$, winding shaft $f^{17}$ therefor, having crank $f^{18}$ and a train of intermeshing gears $f^{19}$ $f^{20}$ $f^{21}$ $f^{22}$, the latter on the governor shaft $f^{23}$, and gears $f^{20}$ and $f^{21}$ being on the shaft $f^{24}$ of the takeup spool $F^2$. The governor preferably comprises a stationary friction rim $f^{25}$ against which the sliding blocks $f^{26}$ on the governor arm $f^{27}$ ride, a spring $f^{28}$ forcing the blocks $f^{26}$ outward. The winding shaft $f^{17}$ is provided with a ratchet $f^{29}$ engaged by a pawl $f^{30}$.

The printing hammer G is carried by a lever $G^1$ having an arm $G^2$ furnished with a spring $G^3$ which actuates the printing hammer to strike the required blow the instant the printing hammer lever is released by the track lever operated trigger or pawl $g$ which engages the pawl end $G^4$ of the printing hammer lever and holds the printing hammer in its raised position ready to print the weight of the car. The printing hammer is automatically raised into position for printing by the track lever M at the exit end of the scale platform as the rear wheel of the mining car Y passes off the scale platform through suitable connecting mechanism hereinafter to be described. The printing hammer releasing trigger or pawl $g$ which holds the printing hammer in its raised position is furnished with a spring $g^1$ to hold it in engagement with the notched end of the printing hammer lever $G^1$, and this trigger or pawl lever $g$ is automatically actuated to release the printing hammer by the track lever M at the exit end of the scale platform B as the front wheel of the mining car Y passes over said track lever M and before such front wheel of the mining car passes off of the scale platform, this being done through suitable connecting mechanism hereinafter to be described.

The piston $H^1$ of the dash-pot H is connected with the scale beam B through its stem $h$. And this piston $H^1$ is furnished with a plurality of upwardly opening valves $h^1$ and a plurality of downwardly opening valves $h^2$, each of said valves being furnished with a plurality of light flat springs $h^3$ $h^4$ $h^5$, each of said springs having a separate and independent adjusting device or screw $h^6$ for regulating the tension thereof and the three springs for each valve being of graduated strength or tension; so that the dash-pot piston may act very quickly and with great precision and steadiness of movement under influence of the scale beam B and counterbalance spring C, and thus impart to the type wheel D a quick, steady movement and cause it to come quickly, accurately and with great delicacy to a true balance as the mining car Y passes under continuous motion over the scale platform.

The inking ribbon K passes from one of its spools $K^1$ to its other spool $K^2$ under suitable guide rollers $K^3$ $K^4$ and between suitable stationary guides $K^5$ $K^6$ over the paper strip X and the type wheel D and stationary indicator type E so that when the printing hammer G descends, it will cause a distinct impression to be made upon the paper strip X. The inking ribbon K is automatically fed or moved as required by the track lever M as the last wheel of the car passes over the same through suitable connecting mechanism hereinafter to be described, and which actuates a pawl lever $K^7$ carrying a pawl $K^8$ which engages a ratchet $K^9$ of the take up ribbon spool $K^1$. The shaft of the ribbon spool $K^1$ is furnished with an indicator disk $K^{11}$ to show that the inking ribbon feed mechanism properly operates.

The track lever M is mounted on the scale platform near the exit end thereof and automatically actuates the releasing trigger of the printing hammer lever to print the weight of the car as the front wheel of the mining car passes over the track lever; and this track lever automatically operates to raise the printing hammer lever ready for printing the weight of the next car when the last wheel of the weighed car passes over it, and also to automatically feed the paper strip and the inking ribbon through the connecting mechanism to be described.

The track lever M is secured to a rock shaft $M^1$ arranged at right angles to the track rail $A^1$ so that the track lever swings in a plane parallel with the track rail, and thus eliminates any variation in movement of the track lever due to varying distances of the flange of the mining car wheel from the track rail $A^1$. The end of the rock shaft $M^1$ which is mounted upon the scale platform A is carried in a rocking bearing $M^2$, the shaft $M^3$ of which is parallel to the track rail so that no binding or other action can take place, liable to produce an inaccuracy in weight. The rocking bearing $M^3$ for the track lever is journaled in a suitable housing $M^4$ secured to the scale platform A. The track lever setting and connecting mechanism between the rock shaft $M^1$ of the track lever M and the feed roller F for the paper strip and the impression hammer and its releasing trigger and the inking ribbon, preferably comprises an arm $n$ on the rock shaft $M^1$, lever $n^1$, horizontally extending connecting link $n^2$, bent lever $n^3$, link $n^4$ furnished with spring $n^5$, link $n^6$, counter bar $n^7$, carrying pawl $n^8$ having spring $n^9$ and engaging ratchet $n^{10}$ on the shaft $n^{11}$ having gear $n^{12}$, meshing with gear $n^{13}$ on shaft $n^{14}$, which shaft $n^{14}$ has a further gear $n^{15}$ meshing with gear $n^{16}$ on cam shaft $n^{17}$, said cam shaft $n^{17}$ has two cams $n^{18}$ and $n^{19}$, the former for raising the impression hammer lever and the latter for releasing the impression hammer trigger. The raising cam $n^{18}$ engages a roller $n^{20}$ on an arm $n^{21}$ connected by a link $n^{22}$ with a lever $n^{23}$ on the rock shaft $n^{24}$ which has an arm $n^{25}$ connected by a link $n^{26}$ connected to the swinging arm or lever $n^{27}$ which is connected by a link $n^{28}$ to the arm or lever $f^5$ on the rock shaft $f^4$. Motion is communicated from the track lever to the spool shaft $K^{10}$ of the inking ribbon K through the connecting mechanism above described in connection with an arm $n^{29}$ on said rock shaft $n^{24}$, which arm $n^{29}$ is connected by a link $n^{30}$ with a bent lever $n^{31}$ connected by a link $n^{32}$ with the pawl lever $K^7$. The shaft $n^{24}$ has a further arm $n^{33}$ connected by an adjustable link $n^{34}$ with a lever $n^{35}$ having an arm $n^{36}$ adapted to engage the impression hammer lever $G^1$ and thus raise the impression hammer automatically as the last wheel of the car passes over the track lever M.

The impression hammer trigger $g$ is automatically actuated to release the impression hammer lever when the first wheel of the car passes over the track lever M by the releasing cam $n^{19}$ on said shaft $n^{17}$, which releasing cam engages a roller $n^{37}$ on an arm $n^{38}$ on rock shaft $n^{40}$, which has a bent arm $n^{41}$ connected by an adjustable link $n^{42}$ with the arm $g^2$ of the releasing trigger $g$. The raising cam $n^{18}$ is further engaged by a roller $n^{43}$ on the pivoted arm $n^{44}$ which is connected by a link $n^{45}$ with the arm or lever $n^{39}$ to afford a double check on the cam and thus secure a more steady movement of the parts.

The ratchet shaft $n^{11}$ is provided with a further ratchet wheel $n^{46}$ which is engaged by a check pawl $n^{47}$ on link $n^{48}$ pivoted to the frame at $n^{49}$ and to the counter bar $n^7$ at $n^{50}$. The pawl $n^{47}$ is furnished with a spring $n^{51}$. The ratchet $n^{11}$ is further engaged by a check pawl $n^{52}$ held in position by a spring $n^{53}$. A spring $n^{54}$ connected with the arm $n^{55}$ on the rock shaft $n^{24}$ serves to restore the rock shaft to position. The counter bar $n^7$ moves up and down in suitable guides $n^{56}$ on the frame and is held under tension or in normal position by a spring $n^{57}$.

A rock shaft P having a handle arm $p$ and arm $p^1$ engaging a projection $p^2$ on the connecting link $n^6$ enables the track lever to be set in position by hand when necessary or required, to cause it to properly operate to raise the impression hammer by the last wheel of the car and to release the impression hammer when operated by the first wheel of the car in case the track lever should be stepped on or otherwise accidentally operated.

The ratchet shaft $n^{11}$ is furnished with a bevel gear $n^{58}$ meshing with a bevel gear $n^{59}$ on a shaft $n^{60}$ carrying a hand setting lever $n^{61}$ and pointer arm $n^{62}$ which registers with the indicating disk $n^{63}$ on the frame to indicate when the counter or setting mechanism is properly set. When the indicator arm points to figure 2 on the indicator disk, the printing hammer is set for printing, and when the indicator arm points to the figure 1 on said disk, the printing hammer is released.

When the inking ribbon has been transferred to the take up spool $K^2$, the pawl $K^8$ is released from engagement with the ratchet $K^9$ by a rocking lever $K^{12}$ which engages the pin $K^{13}$ on pawl $K^8$ so that the delivery spool $K^1$ can be turned by placing a crank on the squared end of its shaft so that the inking ribbon can be again wound on the delivery spool K¹.

I claim:—

1. In an automatic weight recording car scale for weighing cars under action, the combination with a scale platform having track rails thereon, scale beam connected therewith, counterbalance spring and type wheel connected with said scale beam, stationary indicator type adjacent said type wheel, impression hammer and impression hammer lever, of a track lever on the scale platform, a rock shaft constituting the pivot or fulcrum for said track lever and a rocking bearing on the scale platform supporting the inner or platform end of said rock shaft, substantially as specified.

2. In an automatic weight recording car scale for weighing cars under action, the combination with a scale platform having track rails thereon, scale beam connected therewith, counterbalance spring and type wheel connected with said scale beam, stationary indicator type adjacent said type wheel, impression hammer and impression hammer lever, of a track lever on the scale platform, a dash-pot connected to said scale beam, said type wheel being above the scale beam and said counterbalance spring below the same and both directly and shortly connected therewith, substantially as specified.

3. In an automatic weight recording car scale for weighing cars under action, the combination with a scale platform having track rails thereon, scale beam connected therewith, counterbalance spring and type wheel connected with said scale beam, stationary indicator type adjacent said type wheel, impression hammer and impression hammer lever, a releasing trigger for the impression hammer lever, a dash-pot connected with the scale beam, a paper strip feed device, an ink ribbon feed device, a track lever on the scale platform, and connecting mechanism extending from said track lever to said impression hammer lever, to said releasing trigger, to said paper strip feed device and to said ink ribbon feed device, substantially as specified.

4. In an automatic weight recording car scale for weighing cars under action, the combination with a scale platform having track rails thereon, scale beam connected therewith, counterbalance spring and type wheel connected with said scale beam, stationary indicator type adjacent said type wheel, impression hammer and impression hammer lever, a releasing trigger for the impression hammer lever, a dash-pot connected with the scale beam, a paper strip feed device, an ink ribbon feed device, a track lever on the scale platform, and connecting mechanism extending from said track lever to said impression hammer, to said releasing trigger, to said paper strip feed device and to said ink ribbon feed device, said connecting mechanism including a counter bar carrying a pawl, a ratchet actuated thereby and a cam shaft having a raising cam and a releasing cam, substantially as specified.

5. In an automatic weight recording car scale for weighing cars under action, the combination with a scale platform having track rails thereon, scale beam connected therewith, counterbalance spring and type wheel connected with said scale beam, stationary indicator type adjacent said type wheel, impression hammer and impression hammer lever, a dash-pot connected with the scale beam, a paper strip feed device, an ink ribbon feed device, a track lever on the scale platform, and connecting mechanism extending from said track lever to said impression hammer, to said releasing trigger, to said paper strip feed device and to said ink ribbon feed device, said connecting mechanism including a counter bar carrying a pawl, a ratchet actuated thereby and a cam shaft having a raising cam and a releasing cam, and also a check ratchet and check pawl, substantially as specified.

6. In an automatic weight recording car scale for weighing cars under action, the combination with a scale platform having track rails thereon, scale beam connected therewith, counterbalance spring and type wheel connected with said scale beam, stationary indicator type adjacent said type wheel, impression hammer and impression hammer lever, a dash-pot connected with the scale beam, a paper strip feed device, an ink ribbon feed device, a track lever on the scale platform, and connecting mechanism extending from said track lever to said impression hammer, to said releasing trigger, to said paper strip feed device and to said ink ribbon feed device, said connecting mechanism including a counter bar, carrying a pawl, a ratchet actuated thereby and a cam shaft having a raising cam and a releasing cam, and also a hand setting lever, substantially as specified.

7. In an automatic weight recording car scale for weighing cars under action, the combination with a scale platform having track rails thereon, scale beam connected therewith, counterbalance spring and type wheel connected with said scale beam, stationary indicator type adjacent said type wheel, impression hammer and impression hammer lever, a dash-pot connected with the scale beam, a paper strip feed device, an ink ribbon feed device, a track lever on the scale platform, and connecting mechanism extending from said track lever to said impression hammer, to said releasing trigger, to said paper strip feed device, and to said ink ribbon feed device, said connecting mechanism including a counter bar carrying a pawl, a ratchet actuated thereby and a cam shaft having a raising cam and a releasing cam and also an indicator figure and dial, substantially as specified.

8. In an automatic weight recording car scale for weighing cars under action, the combination with a scale platform having track rails thereon, scale beam connected therewith, counterbalance spring and type wheel connected with said scale beam, stationary indicator type adjacent said type wheel, impression hammer and impression hammer lever, a releasing trigger for the impression hammer lever, a dash-pot connected with the scale beam, a paper strip feed device, an ink ribbon feed device, a track lever on the scale platform, and connecting mechanism extending from said track lever to said impression hammer lever, to said releasing trigger, to said paper strip feed device and to said ink ribbon feed device, said track lever on the scale platform swinging in a plane parallel to the track rails, substantially as specified.

9. In an automatic weight recording car scale for weighing cars under action, the combination with a scale platform having track rails thereon, scale beam connected therewith, counterbalance spring and type wheel connected with said scale beam, stationary indicator type adjacent said type wheel, impression hammer and impression hammer lever, a releasing trigger for the impression hammer lever, a dash-pot connected with the scale beam, a paper strip feed device, an ink ribbon feed device, a track lever on the scale platform, and connecting mechanism extending from said track lever to said impression hammer lever, to said releasing trigger, to said paper strip feed device and to said ink ribbon feed device, said scale platform having inclined seats for the track rails to give a grade thereto, substantially as specified.

10. In an automatic weight recording car scale for weighing cars under action, the combination with a scale platform having track rails thereon, scale beam connected therewith, counterbalance spring and type wheel connected with said scale beam, stationary indicator type adjacent said type wheel, impression hammer and impression hammer lever, a releasing trigger for the impression hammer lever, a dash-pot connected with the scale beam, a paper strip feed device, an ink ribbon feed device, a track lever on the scale platform, and connecting mechanism extending from said track lever to said impression hammer lever, to said releasing trigger, to said paper strip feed device and to said ink ribbon feed device, said scale platform having wood or elastic supports beneath the same, substantially as specified.

11. In an automatic weight recording car scale for weighing cars under action, the combination with a scale platform having track rails thereon, scale beam connected therewith, counterbalance spring and type wheel connected with said scale beam, stationary indicator type adjacent said type wheel, impression hammer and impression hammer lever, a releasing trigger for the impression hammer lever, a dash-pot connected with the scale beam, a paper strip feed device, an ink ribbon feed device, a track lever on the scale platform, and connecting mechanism extending from said track lever to said impression hammer lever, to said releasing trigger, to said paper strip feed device and to said ink ribbon feed device, said track lever swinging in a plane parallel to the track rails and having a rock shaft provided with a rocking support, substantially as specified.

GEORGE GOETZ.

Witnesses:
PEARL ABRAMS,
H. M. MUNDAY.